Feb. 15, 1966     W. J. CONOVER     3,235,232
MATERIAL AGITATOR DEVICE AND METHOD OF AGITATION
Filed April 27, 1964     2 Sheets-Sheet 1

INVENTOR
WILLIAM J. CONOVER

BY

ATTORNEY

Feb. 15, 1966     W. J. CONOVER     3,235,232
MATERIAL AGITATOR DEVICE AND METHOD OF AGITATION
Filed April 27, 1964     2 Sheets-Sheet 2

INVENTOR
WILLIAM J. CONOVER
BY
ATTORNEY

United States Patent Office 3,235,232
Patented Feb. 15, 1966

3,235,232
MATERIAL AGITATOR DEVICE AND METHOD
OF AGITATION
William J. Conover, Rhodes, Iowa, assignor to Black,
Sivalls & Bryson, Inc. (B. S. & B.), Kansas City, Mo., a
corporation of Delaware
Filed Apr. 27, 1964, Ser. No. 362,862
6 Claims. (Cl. 259—97)

This invention relates generally to the movement of semi-solid material along drainage means, and relates particularly to a device placeable into a drainage trough for agitating the material therein so as to prevent the material from solidifying and to continue the normal discharge flow of the material.

The invention is concerned with a drainage trench or trough adapted to receive and pass along livestock excreta, hereinafter referred to as manure. Even though the trench itself is so designed to provide the most efficient disposal of the manure, there are times when the semi-solid part of the manure tends to settle and attain a solid state. If permitted to occur, this decreases the effectiveness of the trench, and requires laborious and obnoxious cleaning out of the trench.

It is, therefore, an object of this invention to provide a new and novel material agitator device.

It is another object of this invention to provide a material agitator device for use in a trench containing manure in the semi-solid state, whereby to prevent the manure from settling and to force a flow of the manure in a predetermined direction.

Yet another object of this invention is to provide a device insertable into the liquid part of manure in a trench, and insertable deeper into the semi-solid part of the manure, and operable to force the liquid manure into and through the solid part thereof, whereby to break up any solidification of the manure and to ensure a continued discharge flow thereof.

It is an object of this invention to provide a new and novel method of attaining and maintaining a semi-solid material in a fluid state, preventing thereby a solidification of the material so as to expedite the normal gravitational flow of same.

Still another object of this invention is to provide a material agitator device capable of attaining the above enumerated objectives which is economical to produce, effective in operation, and easy to install and serivce.

These objects, and other features and advantages of this invention will become readily apparent upon referring to the following description and the accompanying drawings, wherein.

Figures 1, 2, 6:
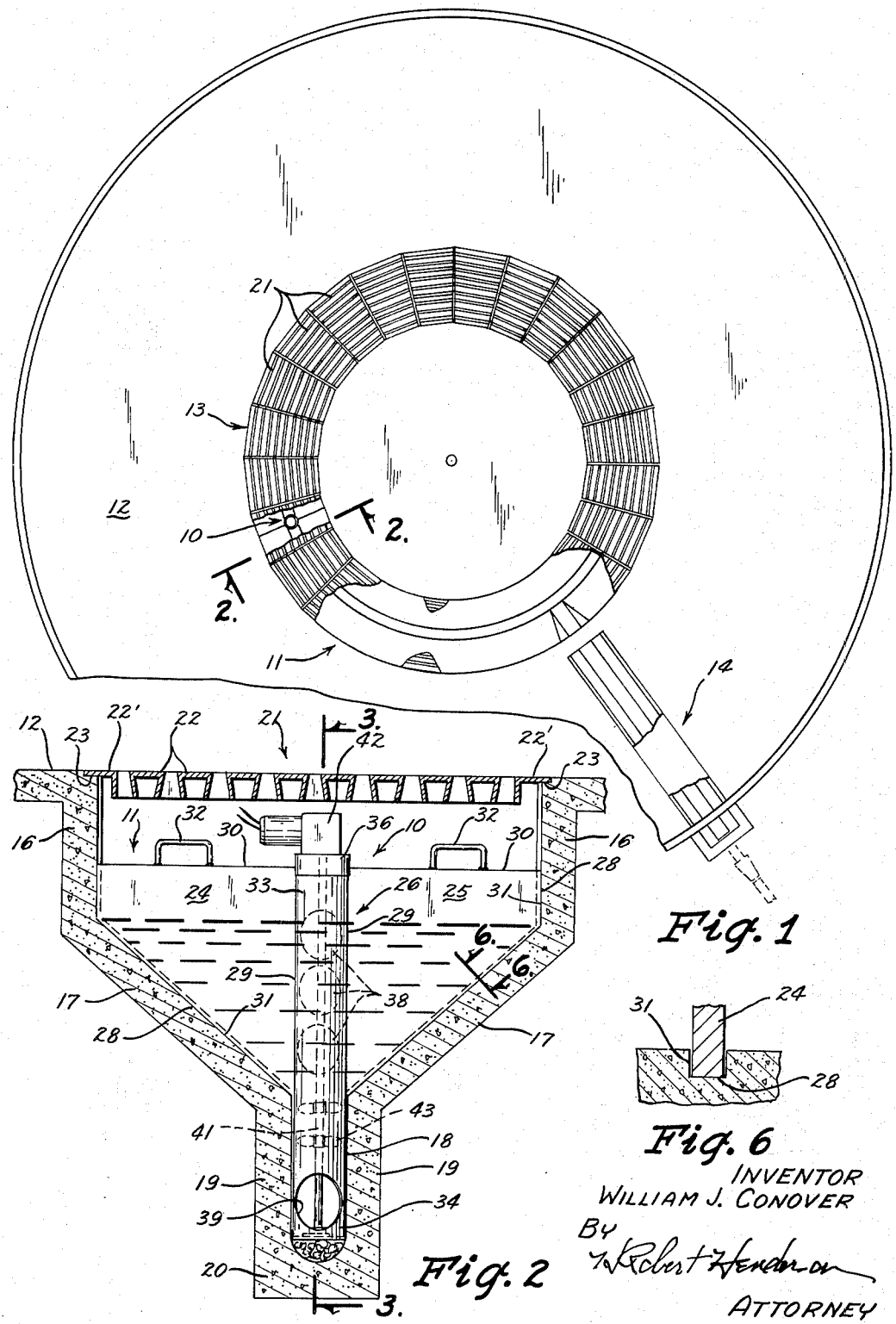
FIG. 1 is a plan view of a farm animal feeding structure embodying the present invention, certain parts broken away for clarity of illustration.
FIG. 2 is an enlarged cross-sectional view taken along the line 2—2 in FIG. 1.
FIG. 6 is an enlarged sectional view taken along the line 6—6 in FIG. 2.

Referring now to the drawings, the material agitator device of this invention is indicated generally at 10 in FIGS. 1 and 2, and is shown mounted in an annular drainage trench 11. The trench 11 is formed in a circular floor 12 of a farm animal feeding structure, and is covered by a plurality of sections of a grate 13. A radial discharge trench 14 communicates with the annular trench 11 and leads externally of the floor 10 to a settling tank (not shown) or the like.

Approximately a one degree slope is provided for the trench 11, which slope begins at a point therein substantially diametrically opposite the connection with the radial trench 14, and which slope extends in both clockwise and counter-clockwise directions from the point toward the radial trench 14. In short, the opposite point is the high side of the annular trench 11, with the low slide being at the communication with the radial trench 14. The latter is then sloped further downwardly toward the outlet.

The annular drainage trench 11 is identical in cross-sectional formation throughout its entire circumference. As best shown in FIG. 2, includes a pair of substantially vertical, radially spaced outer and inner walls 16, which define the upper transverse width of the trench 11. Extending downwardly from the walls 16 and depending radially inwardly toward each other in a converging manner, are a pair of side walls 17 of identical angular relation to the outer and inner walls.

The preferred angular relation of each side wall 17 from the vertical is approximately 45°, and thus the angular relation thereof with the horizontal is also substantially 45°. A relatively narrow channel 18 is formed between the lower ends of the side walls 17 by a pair of vertical, radially spaced bottom walls 19 which depend to join an interconnecting base portion 20 for the trench 11.

The grate 13 (FIGS. 2 and 3) comprises a plurality of segments 21 (FIG. 1), each segment including a plurality of substantially U-shaped members 22 supported in a parallel, radially spaced, side-by-side formation. The length of the members 22 are graduated to provide for their ends being secured to a pair of side plates which extend in a radial manner. Each segment 21 is therefore pie-shaped in plan view.

The innermost and outermost members 22' and 22'', respectively, (FIG. 2) are right angular and are arranged with their horizontal flanges extended outwardly for supporting each grate segment 21 upon shoulders 23 provided therefor in the floor slab 12. The space between the members 22 is sufficient to permit the manure and other wastes to fall through the grate 13 and into the drainage trench 11, but is narrow enough to prevent injury to any of the animals normally using the floor structure 12.

Figure 3:
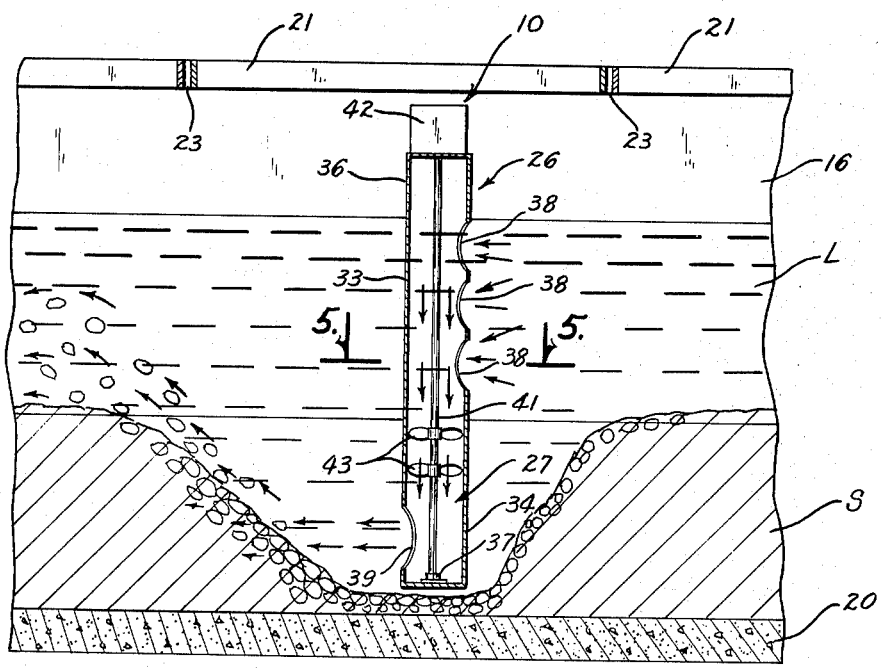
FIG. 3 is an enlarged sectional view taken along the longitudinal axis of the drainage trench, and showing the material agitator device in cross-section.
Figure 4:
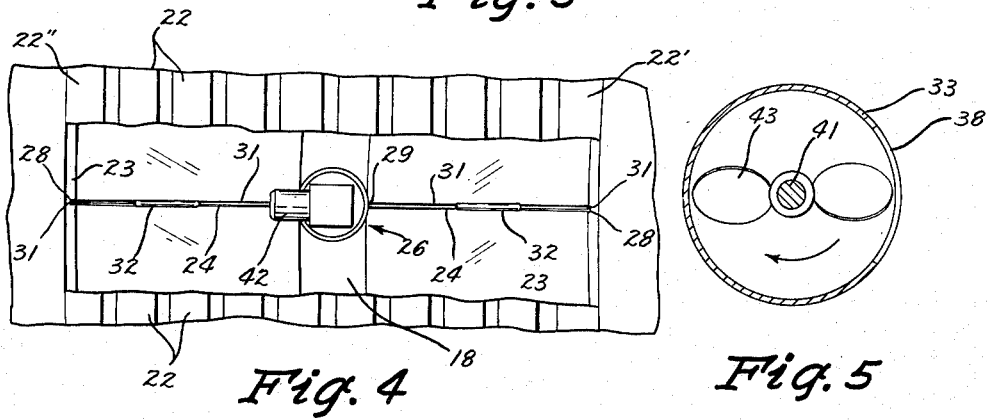
FIG. 4 is a top plan view of the trench, showing the device of this invention installed therein.

As mentioned hereinbefore, even though the drainage trench 11 is designed to provide the most efficient removal of the animal waste which it receives, there are times when the semi-solid matter settles toward the bottom of the trench and attains a solid state S (FIG. 3). Thereupon, the liquid waste L cannot and does not function to build up a hydrostatic pressure to dislodge the settled waste S. Thus, the provision of the material agitator device 10.

This device comprises a partition unit which includes a pair of flat plates 24 and 25 (FIG. 2) which are transversely aligned, and which have secured intermediate thereof a tubular unit 26. Rotatably mounted within the tubular unit 26 is a propeller unit 27 which is operable as will be described more in detail hereinafter to force the liquid waste into and against the solid waste so as to dislodge same.

More specifically, each plate 24 and 25 includes an angular outer edge 28, a vertically disposed inner edge 29, and a horizontally disposed top edge 30. The entire device 10 is adapted to rest in a stationary manner within the drainage trench 11 by means of the outer edges 28 of both plates 24 and 25 depending into a groove 31 formed in the outer and inner walls 16, and the side walls 17 of the trench 11. By this means, and by the use of a pair of handles 32 attached to the top edges 30 of the plates, the device 10 can be raised from its seated engagement in the trench 11 for servicing purposes, and then can be lowered into the transversely aligned groove 31 for stationary operation within the trench and below the grate 13, as best illustrated in FIG. 2.

The tubular unit 26 (FIGS. 2 and 3) comprises a vertically upstanding tube 33 which is secured, as by welding, to each of the inner edges 29 of the two plates 24 and 25. The lower end 34 of the tube 33 depends into the base portion 20 of the trench 11, with the upper end 36 of the tube 33 extended above the normal level of the liquid waste L, but below the grate 13. A bearing unit 37 (FIG. 3) is mounted at the lower end of the tube 33, and a plurality of vertically spaced inlet openings 38 are formed in the side of the tube facing the opposed normal direction of flow of the fluid in the trench 11, with a single outlet opening 39 (FIG. 3) being formed in the opposite side of the tube 33 and considerably lower than the inlet openings 38.

Figure 5:
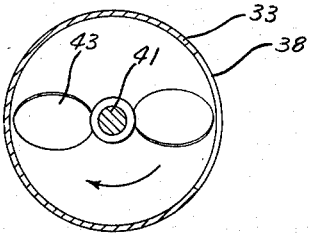
FIG. 5 is an enlarged horizontal view taken along the line 5—5 in FIG. 3.

The tubular unit 26 includes further an elongated shaft 41 the lower end of which is rotatably mounted in the bearing unit 37, and the upper end of which is connected and rotated by a motor 42 which is mounted on the top end of the tube 33. To cause movement of the liquid waste L downwardly within the tube 33, at least a pair of propellers 43 are provided, with their blade arrangement such as to force liquid downwardly within the tube. A plan view of the propellers is shown in FIG. 5.

In the operation of the material agitator device 10, it may first be observed that the device may be placed anywhere within the trench 11 without disturbing the grate 13. Thus, the utilization of the device 10 does not disturb in any way the complete use of the farm animal feeding floor 12. Should it not be desirable to cut or form a groove 31 in the trench 11, a wooden form could easily be built for positioning within the trench 11 for supporting the device 10.

Referring to FIG. 3, the illustration there assumes that the more solidified solid matter S has been allowed to be formed as mentioned hereinbefore, whereby the more liquid animal waste L is forced to pass over and on top of the solid matter S without dislodging same. Upon insertion of the agitator device 10 into the trench, whereby the tube 33 is forced downwardly into the solid matter S, the following action occurs.

Upon operation of the motor 42, resulting in rotation of the shaft 41 and the propellers 43, the liquid waste L is drawn through the inlet openings 38, the latter being placed approximately in line with the liquid waste. This liquid waste L is then forced downwardly within the tube 33, as indicated by the arrows in FIG. 3, whereupon continued rotation of the propellers 43 forces the liquid waste L outwardly through the outlet opening 39, as again indicated by the arrows in FIG. 3.

Thus, the liquid waste L is forced under pressure against the solid waste S and dislodges the solid waste until continued agitation completely dislodges all of the solid waste. It may readily be appreciated, that upon retention of the material agitator device 10 within the trench 11, and continued operation thereof at intermittent times, the settling of any semi-solid waste material will be prevented, and an efficient drainage flow of the material through the drainage trench 11 toward the radial discharge trench 14 will be provided.

The material agitator device 10 may be moved to other locations within the drainage trench 11, depending upon the provision of other grooves 31 and/or formations provided therefore. It is envisaged that the partition unit plates 24 and 25, which act as a dam in use, may be provided with means for resting upon the shoulders 23 of the floor 12, or the floor 12 itself, whereby a groove 31 or the like is unnecessary.

Although a preferred embodiment of this invention has been disclosed and described hereinbefore, it is to be remembered that various modifications and alternate constructions can be made thereto without departing from the true spirit and scope of the invention as defined in the appended claims.

I claim:
1. A material agitator device for use in a trough containing a fluid in a semi-solid state and flowing normally in one direction, the device comprising in combination:
   partition means engageable with the walls of the trough and extended above the fluid surface, said partition means forming a dam against the flow of the fluid thereby and thereover;
   hollow tubular means secured to said partition means in a normally upright position, said tubular means having a pair of openings formed oppositely therein and normally below the level of the fluid; and
   propeller means rotatably mounted in said tubular means and operable in response to rotation to draw the fluid into said tubular means through one opening, and to force the fluid outwardly through the opposite opening.

2. A material agitator device for use in a trough containing a fluid in a semi-solid state and flowing normally in one direction, the device comprising in combination:
   partition means including a pair of aligned flat plates having inner and outer edges extended across the trough to form a dam against the flow of the fluid thereby, the outer edges of the plates adapted to fit the walls of the trough in a complementary manner, the upper edges of said plates extended above the normal level of the fluid;
   hollow tubular means secured to the inner edges of said plates and disposed in a normally upright position, said tubular means having a pair of openings formed oppositely therein and normally below the level of the fluid; and
   propeller means rotatably mounted in said tubular means and operable in response to rotation to draw the fluid into said tubular means through one opening, and to force the fluid outwardly through the opposite opening.

3. A material agitator device for use in a trough containing a fluid in a semi-solid state and flowing normally in one direction, the device comprising in combination:
   partition means engageable with the walls of the trough and forming a dam against the flow of the fluid thereby and thereover;
   hollow tubular means secured to the inner edges of said plates and disposed in a normally upright position, said tubular means having a pair of openings formed oppositely therein and normally below the level of the fluid, said holes being vertically spaced; and
   propeller means rotatably mounted in said tubular means and operable in response to rotation to draw the fluid into said tubular means through the higher opening, and to force the fluid outwardly through the lower opening.

4. A material agitator device for use in a trough containing a fluid in a semi-solid state and flowing normally in one direction, the device comprising in combination:
   partition means engageable with the walls of the trough and forming a dam against the flow of the fluid thereby and thereover;
   hollow tubular means secured to said partition means in a normally upright position, said tubular means having a plurality of vertically spaced inlet openings formed in one side thereof facing oppositely of the direction of fluid flow, and having an outlet opening formed in an opposite side thereof, all of said openings being below the normal level of the fluid; and
   propeller means rotatably mounted in said tubular means and operable in response to rotation to draw the fluid into said tubular means through said inlet openings, and to force the fluid outwardly through said outlet opening.

5. A material agitator device for use in a trough containing a fluid in a semi-solid state and flowing normally in one direction, the device comprising in combination:

partition means engageable with the walls of the trough and forming a dam against the flow of the fluid thereby and thereover;

hollow tubular means secured to said partition means in a normally upright position, said tubular means having a pair of vertically spaced, oppositely facing openings formed therein, and which openings are normally below the level of the fluid, said tubular means having a bearing unit mounted at the base thereof;

propeller means including an axially disposed shaft rotatably mounted in said tubular means, the lower end of said shaft inserted into said bearing unit, said shaft having at least one propeller secured thereto for rotation within said tubular means; and means mounted at the upper end of said tubular means and connected to said shaft at its upper end for imparting rotation thereto.

6. The method of homogenizing a liquid from a semi-solid material having partly solid material normally settled to the bottom of a trough, and having partly fluid material disposed above the solid, the method comprising the following steps:

forcing the fluid to flow in a certain direction about an annular path;

stopping the flow of the fluid completely at one point in the path;

building up a differential height of the fluid on opposite sides of the stopping point, with the higher portion thereof being on the down stream side of the stopping point;

changing the direction of flow of the fluid flowing up to the stopping point from a generally horizontal flow to a flow directed downwardly toward the bottom of the trough;

changing the direction of flow of the fluid flowing downwardly to a generally horizontal flow in the said certain direction of flow; and forcing said last mentioned horizontally flowing fluid under pressure into the solid.

References Cited by the Examiner
FOREIGN PATENTS 575,183 4/1958 Italy.
200,954 3/1939 Switzerland.

WALTER A. SCHEEL, *Primary Examiner.*

CHARLES A. WILLMUTH, *Examiner.*